No. 884,252. PATENTED APR. 7, 1908.
J. R. & A. R. WYGLE.
BARBER'S POLE.
APPLICATION FILED MAY 29, 1907.

WITNESSES
Samuel E. Wade,
C. E. Trainor

INVENTORS
JOHN R. WYGLE
ARCHIBALD R. WYGLE
BY Munn & Co.
ATTORNEYS

UNITED STATES PATENT OFFICE.

JOHN R. WYGLE AND ARCHIBALD R. WYGLE, OF LEAVENWORTH, KANSAS.

BARBER'S POLE.

No. 884,252.    Specification of Letters Patent.    Patented April 7, 1908.

Application filed May 29, 1907. Serial No. 376,250.

*To all whom it may concern:*

Be it known that we, JOHN R. WYGLE and ARCHIBALD R. WYGLE, citizens of the United States, and residents of Leavenworth, in the county of Leavenworth and State of Kansas, have invented an Improvement in Barbers' Poles, of which the following is a specification.

Our invention is an improvement in barbers' poles, and consists in certain novel constructions and combinations of parts hereinafter described and claimed.

Figure 1:
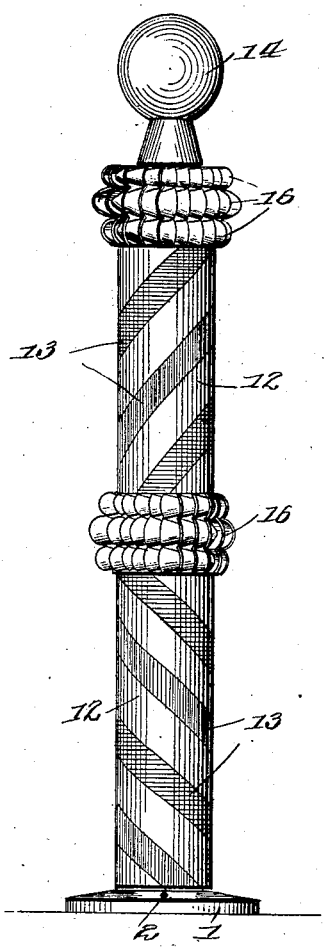
Figure 2:
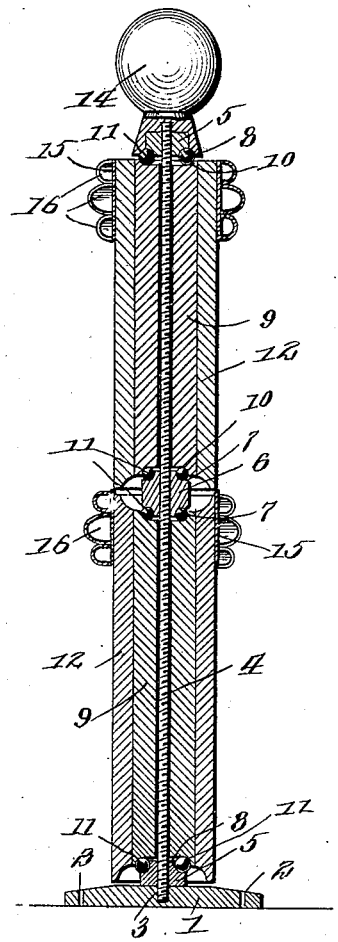
Figure 3:
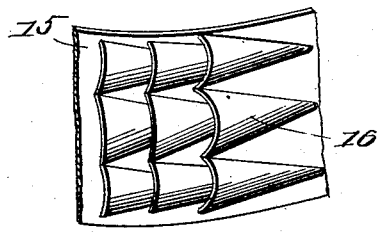

Referring to the drawings forming a part hereof, Figure 1 is a side view of the pole. Fig. 2 is a central longitudinal section of the same; and Fig. 3 is a detail perspective view of a part of the operating mechanism.

In the present embodiment of our invention, a circular base 1 is provided having eyes 2, whereby it may be attached to a support, and with a central screw threaded opening 3, in which is threaded a rod 4. The rod 4 is provided with nuts 5 at each end, and with an intermediate nut 6, all of said nuts being threaded on to the rod, and said central nut 6 is provided at each end with an annular groove 7, and the end nuts are provided on their inner ends with similar grooves 8 for a purpose to be hereafter described. Upper and lower cylindrical bodies 9 encircle the rod, between the nuts, and each of said cylinders is provided on its end faces with grooves 10, co-acting with the grooves of the nuts to form ball races, in which are arranged annular series of balls 11. Each of said cylindrical bodies has fitted on the peripheral surface thereof a casing 12, provided with a plurality of series of spiral stripes 13 of different colors, usually red, white and blue, and the stripes upon one casing run in the opposite direction to the stripes on the other casing, as shown in Fig. 1. An ornamental top 14 is arranged on the upper end of the rod, the lower edge of the said top resting upon the outer end of the upper casing. It will be evident from the description, that the pole proper comprises two independent sections.

An operating device is arranged on the outer end of each section of the pole for rotating the said section by the action of the wind, and the devices are arranged to rotate the sections in opposite directions. The operating device consists of a ring 15 encircling the casing, and secured thereto in any suitable manner, and upon the ring is arranged a plurality of annular series of blades 16, each blade being flared outwardly toward its open end, and the several blades of each series are arranged with the reduced end of one blade in the enlarged end of the succeeding blade. The blades are arranged in three series, the intermediate series being of larger size than the other series, and the series on each ring are arranged in close proximity. The improved pole may be supported in any suitable manner, either vertically, as shown in Fig. 1, horizontally, or reversed, with the ornamental top downward.

We claim:

1. A barber's pole comprising a base, a rod threaded into the base, nuts threaded on to the rod at each end thereof, and provided on their inner ends with grooves, a nut threaded on the center of the rod and provided at each end with grooves, cylindrical bodies mounted on the rod on each side of the central nut, and provided at each end with grooves co-acting with the grooves of the nuts to form ball races, balls in the races, a cylindrical casing provided on its outer surface with spiral stripes of different colors alternately arranged on each of the cylindrical bodies, the stripes on one casing running in the opposite direction to the stripes on the other casing, and an operating device for each of the cylindrical bodies, comprising a ring on the outer end of each casing, each of said rings being provided with a plurality of annular series of blades, each blade being flared outwardly towards its open end, and the several blades of each series being arranged with its reduced end in the enlarged end of the succeeding blade, the series being arranged in close proximity, the blades on one ring being arranged oppositely to the blades on the other ring whereby to operate said casings in different directions.

2. A barber's pole, comprising a base, a rod extending from the base, a plurality of cylindrical sections rotatably mounted on the rod, each of said sections being provided on its outer face with spiral stripes of different colors alternately arranged, the stripes on one section running in the opposite direction to the stripes on the other section, and an operating device for the sections, comprising a ring arranged on the outer end of each section, and a plurality of series of blades in connection with the ring, each blade being flared outwardly toward its open end, and the several blades of each series being arranged with the reduced end of one blade in the enlarged end of the succeeding blade, the blades on one ring being arranged oppositely to the blades on the other ring, whereby to operate said sections in different directions.

3. A barber's pole comprising a base, a rod extending from the base, a plurality of cylindrical sections rotatably mounted on the base, and an operating device for each of said sections, said device comprising a ring on the sections, each of the said rings being provided with a plurality of series of blades, each blade being flared outwardly toward its open end, and the several blades of each series being arranged with the reduced end of one blade in the enlarged end of the succeeding blade, the blades upon one ring being oppositely arranged to the blades on the other ring.

4. A barber's pole comprising a base, a rod extending from the base, a plurality of cylindrical sections rotatably mounted on the base, and an operating device for each of said sections, said device comprising a ring on the sections, each of the said rings being provided with a plurality of series of blades, each blade being flared outwardly toward its open end, and the several blades of each series being arranged with the reduced end of one blade in the enlarged end of the succeeding blade.

5. A barber's pole comprising a plurality of independently rotatable sections, and an operating device for each of the sections, comprising a plurality of annular series of blades on the periphery of the section, each blade being flared outwardly toward its open end, and the several blades of each series being arranged with the reduced end of one blade in the enlarged end of the succeeding blade, the blades on one section being arranged oppositely to the blades on the other section.

6. A barber's pole, comprising a plurality of independent rotatable sections, and an operating device for each section, consisting of an annular series of blades, each blade being flared outwardly toward its open end, the several blades of each series being arranged with the reduced end of one in the enlarged end of the succeeding blade, the blades on one section being arranged oppositely to the blades of the other section.

JOHN R. WYGLE.
ARCHIBALD R. WYGLE.

Witnesses:
JAMES C. SMITH,
ED. J. BUTT.